United States Patent [19]

Taylor et al.

[11] 4,230,660

[45] Oct. 28, 1980

[54] EPOXY-BORAX-COAL TAR COMPOSITION FOR A RADIATION PROTECTIVE, BURN RESISTANT DRUM LINER AND CENTRIFUGAL CASTING METHOD

[75] Inventors: Robert S. Taylor; Norman W. Boyer, both of Livermore, Calif.

[73] Assignee: The United States of America as represented by the United States Department of Energy, Washington, D.C.

[21] Appl. No.: 3,840

[22] Filed: Jan. 16, 1979

[51] Int. Cl.$^2$ .......................... A62D 5/00; G21F 1/10
[52] U.S. Cl. .................... 264/311; 252/478; 260/28 R; 260/37 EP; 260/DIG. 24
[58] Field of Search ..... 264/311; 260/28 R, DIG. 24; 252/478

[56] References Cited

U.S. PATENT DOCUMENTS

| | | | |
|---|---|---|---|
| 2,796,411 | 6/1957 | Zirkle et al. | 252/478 |
| 2,796,529 | 6/1957 | Morrison | 250/108 |
| 2,906,720 | 9/1959 | Simpson | 260/28 |
| 2,942,116 | 6/1960 | Axelrad | 250/108 |
| 3,010,153 | 11/1961 | Bittner | 264/311 |
| 3,062,771 | 11/1962 | Boenau et al. | 260/28 R |
| 3,112,530 | 12/1963 | Boggs et al. | 264/311 |
| 3,133,887 | 5/1964 | Alliegro et al. | 252/478 |
| 3,203,906 | 8/1965 | Evans et al. | 252/478 |
| 3,238,148 | 3/1966 | Osborne | 252/478 |
| 3,438,903 | 4/1969 | Prahl | 252/478 |
| 4,123,392 | 10/1978 | Hall et al. | 252/478 |

OTHER PUBLICATIONS

Lee et al., "Epoxy Resins," 1967 McGraw-Hill, pp. 23-20 & 15-17 & 23-16.

*Primary Examiner*—Murray Tillman
*Assistant Examiner*—A. H. Koeckert
*Attorney, Agent, or Firm*—Richard G. Besha; Roger S. Gaither; L. E. Carnahan

[57] ABSTRACT

A boron containing burn resistant, low level radiation protection material useful, for example, as a liner for radioactive waste disposal and storage, a component for neutron absorber, and a shield for a neutron source. The material is basically composed of Borax in the range of 25-50%, coal tar in the range of 25-37.5%, with the remainder being an epoxy resin mix. A preferred composition is 50% Borax, 25% coal tar and 25% epoxy resin. The material is not susceptible to burning and is about 1/5 the cost of existing radiation protection material utilized in similar applications.

8 Claims, No Drawings

EPOXY-BORAX-COAL TAR COMPOSITION FOR A RADIATION PROTECTIVE, BURN RESISTANT DRUM LINER AND CENTRIFUGAL CASTING METHOD

BACKGROUND OF THE INVENTION

The invention described herein was made at the Lawrence Livermore Laboratory in the course of, or under, Contract No. W-7405-ENG-48 between the United States Department of Energy and the University of California.

The invention relates to low level radiation protection material, particularly to material useful as a liner for radioactive waste disposal, for example, and more particularly to a boron containing, burn resistant material for use as a radiation protection liner.

Various approaches to the problem of providing an effective, yet inexpensive low level radiation protection material have been developed for applications such as shields for neutron sources, neutron absorbers, and radioactive waste storage and disposal containers or drums. For example, radioactive waste storage and disposal in drums requires the use of drum liners containing a substantial amount of low atomic weight atoms, such as boron, to reduce the outward neutron energy flux. Presently known liners utilize a borated material such as boron suspended in a binder which is largely a polyethylene. Two disadvantages of the present liners are: (1) they are susceptible to burning, and (2) their material cost is high, approximately $2.50 per pound. Thus a need has existed for a low level radiation protection material which is not susceptible to burning and is less expensive than that presently utilized in applications such as the storage and disposal of radioactive waste.

SUMMARY OF THE INVENTION

The present invention fills the above-mentioned need by providing a material which is relatively inexpensive and which is not susceptible to burning. The invention involves a boron containing, burn resistant, radiation protective material which can be produced at less than one-fifth of the cost (about $0.40 per pound) of the previous material utilized, for example, as a liner for low level radioactive waste disposal and storage drums. In addition, the material of this invention has applications as a shield for neutron sources, and as a neutron absorber, etc. A preferred composition of the material of this invention consists basically of 50% Borax (sodium borate) by weight, 25% coal tar, and 25% epoxy resin mix. However, the Borax content can vary from 25% by weight through 50% by weight, for example, in 5% increments, with the percentage of coal tar and epoxy resin mix, of a 1-to-1 ratio by weight, changed proportional to the percentage change of the Borax.

Therefore, it is an object of this invention to provide a boron containing, burn resistant, low level radiation protective material.

A further object of the invention is to provide a burn resistant material usable in low level radiation protection applications which is substantially less expensive than prior utilized material.

Another object of the invention is to provide a material which is useful as a liner for radioactive waste disposal and storage, as a shield for a neutron source, as a component for a neutron absorber liner, etc.

Another object of the invention is to provide an inexpensive, burn resistant material for low level radiation protective applications which is basically composed of about 25%-50% Borax, about 25%-37.5% coal tar, and about 25%-37.5% epoxy resin mix.

Another object of the invention is to provide a method for producing liners for drums, etc., from burn resistant low level radiation protective material.

Other objects of the invention will become readily apparent to those skilled in the art from the following description.

DETAILED DESCRIPTION OF PREFERRED EMBODIMENT

The invention involves a burn-resistant, inexpensive material for low level radiation protective applications, and method for fabricating a liner using such material. The material is less than 1/5 the cost of previously utilized material for applications such as drum liners for radioactive waste storage/disposal. In addition the boron containing, burn resistant material has applications as a shield for a neutron source, and as a component for a neutron absorber, etc., where low level radiation protection is needed. The material in preferred composition is composed of 50% Borax (sodium borate) by weight, 25% coal tar, with the remaining 25% being an epoxy resin mix. The percentage of Borax may be in the range of 25%-50% with the weight percentage of the coal tar and epoxy resin mix being adjusted proportional to the weight percentage change in Borax on a 1-to-1 weight percent basis (from 25-37.5%).

The preferred composition of the material or compound of this invention, designated as TB-100, consists of the following constituents, set forth in Table I by weight percent and by approximate cost per pound:

TABLE I

| CONSTITUENT | WEIGHT PERCENT | COST |
| --- | --- | --- |
| Epon 828 | 10.822 | $0.75/lb. |
| Dow XD 7114 | 4.654 | 1.00/lb. |
| Ancamine 1648 | 4.654 | 1.50/lb. |
| Ancamine AD | 4.870 | 1.50/lb. |
| CP-524 (coal tar) | 25.00 | 0.08/lb. |
| Borax | 50.00 | 0.10/lb. |

The material is mixed in vacuo and at room temperature. The Dow XD-7114 resin (manufactuered by Dow Chemical Company, basically consisting of an aliphatic diepoxide) is a relatively thin (30 centipoise) liquid at room temperature and affords easier flow of the TB-100. The epoxy resin Epon 828 (manufactuered by Shell Chemical Corporation, basically consisting of a diepoxide resin identified as a digycidyl ether of Bisphenol-A) is normally more viscous (12,000 centipoise) and when cured provides a very hard final product. When the two resins (Dow XD 7114 and Epon 828) are mixed together with the other materials, the product is moderately viscous but does allow sufficient fluidity in pouring it into a cylindrical centrifugator, for example. The centrifugator is slowly spun up to a speed of 150-200 linear feet per minute (at the outer circumference) and allowed to continue the spin for 8-16 hours curing time at room temperature (nominally 75° F.). The result is a hard liner of a thickness (1 cm to 2 in) which maintains its integrity and resists burning due to Borax and its water of hydration (Borax constituent) bound into the matrix. Ancamine 1648 is manufactured by Pacific Anchor Chem. Corporation and basically consists of a modified aromatic amine, while Ancamine AD is also made by Pacific Anchor Chem. Corporation but basically consists of a modified aliphatic amine.

Coal tar, as utilized herein, is defined as a by-product in the destructive distillation of coal as described on page 255 of "The Merck Index of Chemicals and Drugs", Sixth Edition, by Merck and Company, Inc., Rahway, N.J., 1952.

Tests, described hereinafter, conducted on drum liners, made and cured as above described showed the material to be burn-resistant and having structural integrity.

The tests involved severe flame exposure of samples (1"×4"×-"; average weight of ≈1150 gms) having a Borax load ranging from 25% to 50% in 5% increments. The samples were exposed to a defusion flame from a natural gas burner of dimensions 13"×15:, the measured temperature of this exposure being 550° C. The samples were exposed for durations of 5, 15, and 30 minutes.

The following measurements and observations were noted for each material during the test series:
1. Sample weight loss due to fire exposure.
2. Combustion and smoking behavior during exposure.
3. Horizontal bending moment; pre and post-exposure;
   (This parameter was measured to determine the structural change in the Borax loaded polymer resulting from flame exposure. The procedure involved extending 10" of the specimen over the edge of a horizontal surface and noting the deflection caused by a 1 Kg weight placed on the suspended end for 30 seconds)
4. Bulk flexibility test; post-exposure only; (the flexibility (or brittleness) was qualitatively observed by bending the specimen over the sharp edge of a table and then returning it to flatness, if possible).

During all exposure durations, the materials exhibited minimal flaming and moderate smoking. After the natural gas flame source was extinguished the flames on the samples died out. It was found that the shorter flame source exposure resulted in longer post source exposure flaming (approximately 1 minute). This was possibly a result of a minimum char layer on the samples surface. The smoke response was greater with longer exposure durations. This may be a concern, if large quantities of the material are exposed to high temperature sources.

The weight loss trends shown in Table II illustrated that weight loss is directly proportional to exposure duration and evenly proportional to Borax load. As indicated above the average sample weight was about 1150 gm.

TABLE II

| Exposure | Weight loss vs % Borax (gms) | | | | | |
|---|---|---|---|---|---|---|
| Time (min) | 25% | 30% | 35% | 40% | 45% | 50% |
| 5 | 73 | 72 | 72 | 50 | 52 | 37 |
| 15 | 188 | 88 | 158 | 165 | 156 | 117 |
| 30 | 337 | 353 | 292 | 310 | 315 | 272 |

The bending moment (deflection), summarized in Table III, indicates that the degree of bending is inversely proportional to Borax load for pre-exposure samples. After exposure, the degree of bending appears constant with increasing Borax for each exposure level, but is inversely proportional to exposure duration at constant Borax load.

TABLE III

| Exposure | Material deflection vs % Borax (cm) | | | | | |
|---|---|---|---|---|---|---|
| Time (min) | 25% | 30% | 35% | 40% | 45% | 50% |
| 0 | 16.7 | 6.2 | 4.7 | 4.3 | 6.5 | 2.3 |
| 5 | 2.3 | 0.8 | 1.8 | 2.1 | 1.8 | 2.5 |
| 15 | 0.2 | 0.2 | 0.3 | 0.1 | 0.5 | 0.4 |
| 30 | 0 | 0 | 0 | 0 | 0 | 0 |

From Table IV, can be seen the post exposure bulk flexibility relative to the following index established for these tests; namely, a scale of 1–6 where 1 indicates samples of high flexibility, and 6 indicates extreme brittleness, the numbers between being subjectively ranged. This data indicates that the materials tend to increase in bulk flexibility with Borax load at constant exposure duration. However, as exposure duration increased, so did the brittleness.

TABLE IV

| Exposure | Material flexibility vs % Borax (relative) | | | | | |
|---|---|---|---|---|---|---|
| Time (min) | 25% | 30% | 35% | 40% | 45% | 50% |
| 5 | 6 | 5 | 4 | 3 | 2 | 1 |
| 15 | 6 | 6 | 5 | 4 | 3 | 2 |
| 30 | 6 | 6 | 6 | 5 | 4 | 3 |

The above described tests clearly establish that the material of this invention retains its structural integrity during and after fire exposure, and thus would still provide shielding. Moreover, the tests illustrated that the material did not contribute to a combustion reaction, and thus would not constitute a flammable hazard.

The results of the tests show that greater fire protection, as well as mechanical property integrity are maintained at higher level of Borax content (approximately 50% by weight), but even at lower levels, such as 25% by weight of Borax, some protection is still afforded. Of course, at lower levels of Borax, radiation protection is also lessened.

While the above description of the method has been directed to forming a cylindrical liner of the material of the invention, for other applications it would be processed and cured in the desired configuration so as to provide the desired hard layer or liner of the burn resistant material. Tests have illustrated that, for example, a 1 cm thick liner of 50% Borax by weight will reduce the neutron flux by a factor of 30. Tests have also shown, that with a layer of the material only 1 cm thick, adequate low level radiation protection was provided.

It is readily seen, that from a cost comparison standpoint of $0.40/lb. of the material produced by this invention to the $2.50/lb. cost of the previously utilized low level radiation protective material, the cost is less than 1/5 that of the prior material, a substantial cost savings.

Accordingly, the present invention provides a boron containing, burn resistant, radiation protective material which is less than 1/5 the cost of previously used material. The material is particularly useful as a liner for low level radioactive waste disposal and storage, but has other applications such as a shield for a neutron source, or as a component for a neutron absorber.

While particular parameters and uses have been set forth for purposes of description, it is not intended to limit the invention to the exact parameters or operational procedures set forth, since modifications may become apparent to those skilled in the art, and it is intended to cover in the appended claims all such modifications as come within the spirit and scope of the invention.

What we claim is:

1. A method for producing a radiation protective, burn resistant material for drum liners used in radioactive waste storage, comprising the steps of: forming a mixture by mixing together substantially 10.8–16.2 weight percent of a first material consisting essentially of digycidyl ether of Bisphenol-A, substantially 4.6–6.9 weight percent of a second material consisting essentially of an aliphatic diepoxide, substantially 4.6–6.9- weight percent of a third material consisting essentially of an aromatic amine, substantially 4.8–7.2 weight percent of a fourth material consisting essentially of an aliphatic amine, substantially 25–37.5 weight percent coal tar, and substantially 25–50 weight percent borax; and spinning the the mixture in a centrifugator for a time period of about 8–16 hours for forming the mixture into a liner and for curing of the thus formed liner.

2. A cured burn resistant radiation protective material produced from materials consisting essentially of about 25–50 weight percent borax, about 25–37.5 weight percent coal tar, and about 25–37.5 weight percent epoxy resin mix with said resin mix comprising a digycidyl ether of Bisphenol-A, an aliphatic diepoxide, an aromatic amine, and an aliphatic amine, and with the percentage of coal tar to epoxy resin mix being on a one-to-one ratio.

3. The material defined in claim 2, wherein said epoxy resin mix consists of about 10.8–16.2 weight percent of the first material, about 4.65–6.9 weight percent of the second material, about 4.65–6.9 weight percent of the third material, and about 4.87–7.2 weight percent of the fourth material, the percentages being based on the total composition.

4. The material defined in claim 3, wherein the weight percentage of the first, second, third, Dow XD 7114, and fourth materials are respectively 10.822, 4.654, 4.654, and 4.870; and with the coal tar consisting of 25 weight percent and the borax being 50 weight percents.

5. A radiation protective, burn resistant drum liner for radioactive waste made in accordance with the method defined in claim 1.

6. The method defined in claim 1, wherein the step of spinning the mixture in the centrifugator is carried out at circumferential speeds of about 150–200 linear feet per minute.

7. The material defined in claim 2, wherein said epoxy resin mix comprises about 10.8–16.2 weight percent digycidyl ether of Bisphenol-A, about 4.65–6.9 weight percent aliphatic diepoxide, about 4.65–6.9 weight percent aromatic amine, and about 4.87–7.2 weight percent aliphatic amine.

8. The material defined in claim 7, wherein the weight percentage of the digycidyl ether Bisphenol-A, aliphatic diepoxide, aromatic amine, and aliphatic amine are respectively about 10.822, 4.654, 4.654, and 4.870; and with the coal tar consisting of about 25 weight percent, and the borax being about 50 weight percent.

* * * * *